United States Patent [19]

Inuzuka et al.

[11] 4,016,529
[45] Apr. 5, 1977

[54] BODY DETECTING DEVICE

[75] Inventors: Tsuneki Inuzuka, Fuchu; Katsushi Furuichi, Yokohama; Osamu Sawamura, Yamato; Yoshimasa Kimura, Kawasaki; Hisashi Sakamaki, Yokohama, all of Japan

[73] Assignee: Canon Kabushiki Kaisha, Tokyo, Japan

[22] Filed: Apr. 25, 1975

[21] Appl. No.: 571,553

[30] Foreign Application Priority Data

May 1, 1974 Japan .............................. 49-49219

[52] U.S. Cl. .............................. 340/1 R; 343/5 PD
[51] Int. Cl.² .............................. G01S 9/66
[58] Field of Search ............ 340/1 R, 16 C, 258 B; 343/5 PD

[56] References Cited

UNITED STATES PATENTS

| 3,149,561 | 9/1964 | Lancaster | 340/1 R |
|---|---|---|---|
| 3,214,700 | 10/1965 | Hook | 340/6 R |
| 3,678,492 | 7/1972 | Casper | 340/258 B |

Primary Examiner—Richard A. Farley
Attorney, Agent, or Firm—Fitzpatrick, Cella, Harper & Scinto

[57] ABSTRACT

A device for detecting a body comprises transmitter means, receiver means for receiving the signal from the transmitter means, means for setting the level of a reference signal by the reception signal from the receiver means provided when the body is in a reference condition, to correct the reference signal, which reference signal provides a reference for identifying the reception signal, and comparator means for identifying the reception signal in accordance with the reference level connected to the reference level setting means. The body detecting device effects the detection by the output of the comparator means.

15 Claims, 15 Drawing Figures

BODY DETECTING DEVICE

BACKGROUND OF THE INVENTION

1. Field of the Invention

This invention relates to a body detecting device which detects a body by using a transmitter and a receiver, and more particularly to a body detecting device which can always perform a stable detecting function for any fluctuation of reception signal resulting from any other factor than the body.

In a device which uses a set of transmitter and receiver for signal media propagated through the space such as electromagnetic waves (including light waves), sound waves or the like, to detect the influence imparted from a body to the reception signal to thereby detect the presence, condition and position of the body, the reception signal, especially the reception gain, may usually be fluctuated by the atmospheric conditions such as temperature, humidity, and mixture of special gases with the air, and may further be fluctuated, even under the same atmospheric conditions, by unstable factors such as contamination of the transmitter and/or the receiver, irregularities of their efficiencies, difference in arrangement or installation of the transmitter and the receiver into the detecting device, and variation in efficiency with time.

These fluctuations are caused entirely independently of the condition of presence or position of the body and therefore, increase the detection error, which means a great drawback when the device of this type is used.

2. Description of the Prior Art

In order to overcome these disadvantages, it has heretofore been the practice either to use a detecting device provided with a set of transmitter and receiver hardly susceptible to the influences of the above-described variable factors, or to calibrate the gain of the transmitter and receiver each time the device is used or to use the device only under limited conditions, whereas in these cases the detecting device is expensive or the conditions for its use are limited. For example, Japanese Patent No. 58866 published in 1973 discloses a device provided with a transmitter and a receiver wherein reception gain is fed back to the transmitter side to correct any fluctuation of the reception gain, but this is unsuitable for the detection of a transparent body because it is of the type in which the brightness of the light source employed as the transmitter is corrected in accordance with a specific fluctuation of the quantity of light received, and accordingly the types of the body to be detected by such device are limited and moreover, the arrangement and locations of the transmitter and the receiver are also limited inasmuch as feedback between the transmitter and the receiver is utilized.

SUMMARY OF THE INVENTION

It is an object of the present invention to eliminate the above-noted disadvantages and to provide a body detecting device which is free of malfunctions due to the fluctuation of the reception signal resulting from any other factor than the body to be detected, and which performs a stable detecting function.

It is another object of the present invention to provide a body detecting device which does not restrict the types of the body to be detected but can accurately effect the detection of transparent bodies as well.

It is still another object of the present invention to provide a body detecting device which does not restrict the locations of the transmitter and the receiver and which need not be adjusted each time it is used and is not limited in place and time for its use.

It is yet still another object of the present invention to provide a body detecting device which does not malfunction even for a very low level of the reception signal.

It is a further object of the present invention to provide a body detecting device which eliminates detection errors and also increases the speed at which the presence of the body is detected.

It is a further object of the present invention to provide a body detecting device which is effective for the detection of the passage of copy medium through its path of travel in a copying apparatus.

The invention will become more fully apparent from the following detailed description thereof taken in conjunction with the accompanying drawings.

DESCRIPTION OF THE PREFERRED EMBODIMENTS

To achieve the above-noted objects, the present invention utilizes a reference signal providing a reference for identifying a reception signal during body detection, and the reference signal is adjusted in accordance with fluctuations of the reception signal resulting from any other factor than the body.

Figure 1:
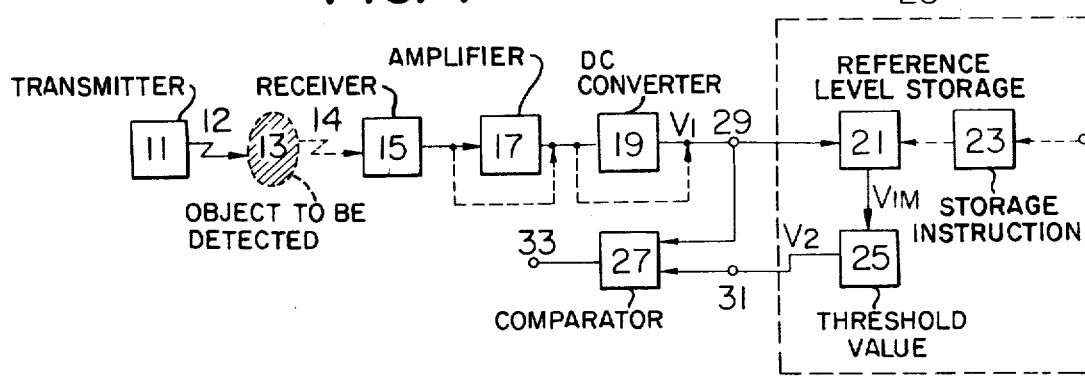
FIG. 1 is a block diagram showing the basic construction of the present invention.

The basic construction of the present invention will hereinafter be described by reference to the block diagram of FIG. 1. A transmitter 11 is the means for generating a signal 12 of the signal medium as described which is propagated through free space, and a receiver 15 is the means for receiving the signal 14 from the transmitter and converting it into an electrical signal. The transmitter and the receiver are arranged so that the gain, phase, etc. of the signal delivered from the transmitter to the receiver (the gain will hereinafter be taken as an example) may be affected in relation to the presence, condition, etc. of a subject body 13. This arrangement may be either an arrangement wherein the transmitter and the receiver are opposed to each other with the body interposed therebetween to thereby decrease the reception gain or an arrangement wherein the signal from the transmitter is reflected by the body and received by the receiver to increase the reception gain. The signal received may be applied to amplifier means 17. If the said signal could not be derived as a direct current from the receiver itself, it may be converted by DC converter means 19 into a DC level corresponding to the reception level. The DC level, $V_1$, is put out from a terminal 29 into comparator means 27 and reference level setting means 28. The reference level setting means 28 is for relatively correcting the quantity of reception resulting from the delivery of the signal in the event that such quantity of reception is varied by any other factor than the body, and may comprise reference level store means 21 and threshold value setting means 25, and further, if required, store instructing means 23.

The reference value store means 21 is for storing the output $V_1$ of the terminal 29 as the reference level, which output is that provided under reference condition which is the condition of the reception signal when it is subject to a referential influence by the body, for example, the condition of the signal when the body is absent or when the transmitter and receiver and the body assume a particular positional relationship.

For instance, when a reception gain is varied so as to decrease or increase in response to the presence of the body, the reference level store means 21 stores a maximum or a minimum value corresponding to the absence of the body and moreover, re-stores the reference level in response to any fluctuation of the reference condition.

Also, in view of the possibility that the stored reference level may fluctuate independently of the reception signal to create an error in the detection of the body, antivolatilization means is further provided for preventing any fluctuation of said reference level and for maintaining the reference level at its proper value.

In the present invention, the store instructing means 23 causes the reception signal $V_1$, which is not always of maximum or minimum value but of suitable value as required, to be stored as a reference level, and is operable by a predetermined repetitive signal or an instruction signal instructing re-storage in accordance with fluctuation of the reference condition, and acts on the reference level store means 21 as indicated by a broken line in the drawing. Next, the threshold value setting means 25 generates a signal which will provide a reference for comparatively determining whether the reception signal has detected the body or not, and receives as input the reference level $V_{1M}$ stored and re-stored and puts out a threshold value $V_2$ to the comparator means 27 through a terminal 31. The comparator means 27 compares the signals $V_1$ and $V_2$ to determine whether the body has been detected or not, and generates a predetermined signal through a terminal 33.

Figure 2:
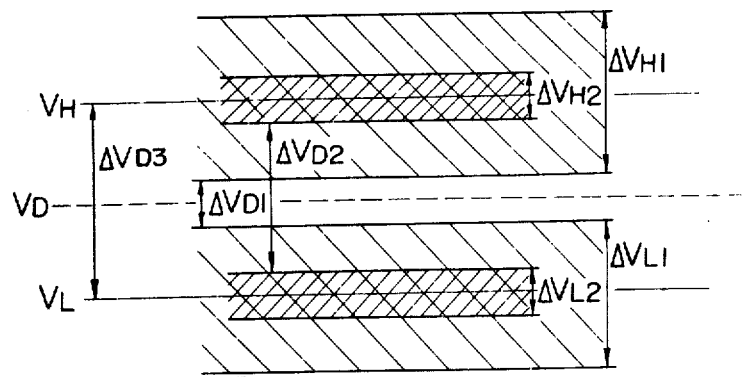
FIG. 2 is a level correlation diagram illustrating the level fluctuations of the reception signal.

FIG. 2 is a level correlation diagram illustrating how the reception signal is fluctuated by the body intervening between the transmitter and the receiver and how it is affected by any other factor than the body.

It is assumed that the level in the absence of the body is $V_H$, that the level is reduced down to $V_L$ by the presence of the body, and that the comparative level or threshold value which provides the reference for detecting such fluctuation is $V_D$. Here, the values assumed by $V_H$ and $V_L$ in accordance with the other factors than the body which affect the reception gain are the values fluctuated by: 1) the difference in initial gain resulting from fluctuation of the efficiency of transmitter and receiver and irregularities of the mounting thereof; 2) those of the gain fluctuations resulting from the variation in the atmospheric conditions or the variation with time in efficiency of the transmitter and receiver which are relatively slowly produced; and 3) those of the gain variations which are suddenly produced.

The diagram of FIG. 2 shows an average by time of the ranges of fluctuation mentioned under items 2) and 3) above. The slow fluctuations under item 2) above refer to fluctuations wherein the gain is fluctuated during a period over the period during which the aforementioned reference level is re-stored. As regards the gain irregularity mentioned under item 1) above, the detection error could heretofore been prevented anyhow by adjusting the threshold value each time the device was used. However, the relative fluctuations to $V_H$ and $V_L$ of the threshold value resulting from the factors mentioned under items 2) and 3) above could not be prevented during the detecting operation. More specifically, in FIG. 2, if the fluctuations resulting from the factors mentioned under item 2) above are represented by $\Delta V_{H1}$ and $\Delta V_{L1}$, with $\Delta V_{D1}$ as the difference between the lower and the upper limit of these, and if the fluctuations resulting from the factors mentioned under item 3) above are represented by $\Delta V_{H2}$, $\Delta V_{L2}$ and $\Delta V_{D2}$, then it may happen with the conventional device that the threshold value $V_D$ is not varied in accordance with the presence of the body as do the values $V_H$ and $V_L$. As a result, the lower limit of the fluctuation range $\Delta V_{H1}$ mentioned under item 2) or the upper limit of the fluctuation range $\Delta V_{L1}$ may exceed the predetermined threshold value $V_D$, which in turn means complete loss of the detecting function.

The fluctuation range mentioned under item 3) above is less than that mentioned under item 2) above and momentary fluctuations can be pre-eliminated as by filter and thus, the faults attributable to item 3) are immaterial.

In view of the above-noted points, the present invention stores, for example, the level $V_H$ as the reference level and re-stores it when fluctuated or at a suitable time, and corrects the threshold value $V_D$ in accordance with the fluctuation range $\Delta V_{H1}$. Thus, the levels $V_H$ and $V_D$ are not relatively fluctuated even if the level $V_H$ is fluctuated, and this means that the threshold value $V_D$ can be preset within a wide range $\Delta V_{D2}$ which is substantially approximate to $\Delta V_{D3}$.

As a result, if the maximum value of $V_L/V_H$, which is the attenuation ratio of the reception signal by the body, is known, the device can be used without the necessity of adjustment, irrespective of the fluctuation as mentioned under item 1) above, by setting $V_D$ relative to $V_H$ with said attenuation ratio taken into account.

Further, the present invention can set the threshold value $V_D$ to a level near the lower limit of $\Delta V_{H2}$ by the threshold setting means 25, and particularly, in the detection of the presence of the body, the threshold value immediately drops from $V_H$ to a level which may be judged to be within the range of $V_L$ and thus, the presence of the body can be detected very quickly. Furthermore, according to the present invention, the instability resulting from the fluctuations mentioned under item 2) above can be corrected on the reception side and does not rquire changes on the transmitter side. This permits the use of a transmitter which is spaced apart from the other elements related to the detection function, or the use of a receiver which is not capable of controlling the transmitter output, and thus the present invention is greatly advantageous over the method whereby the transmitter output is controlled by the quantity of reception.

Figure 3:
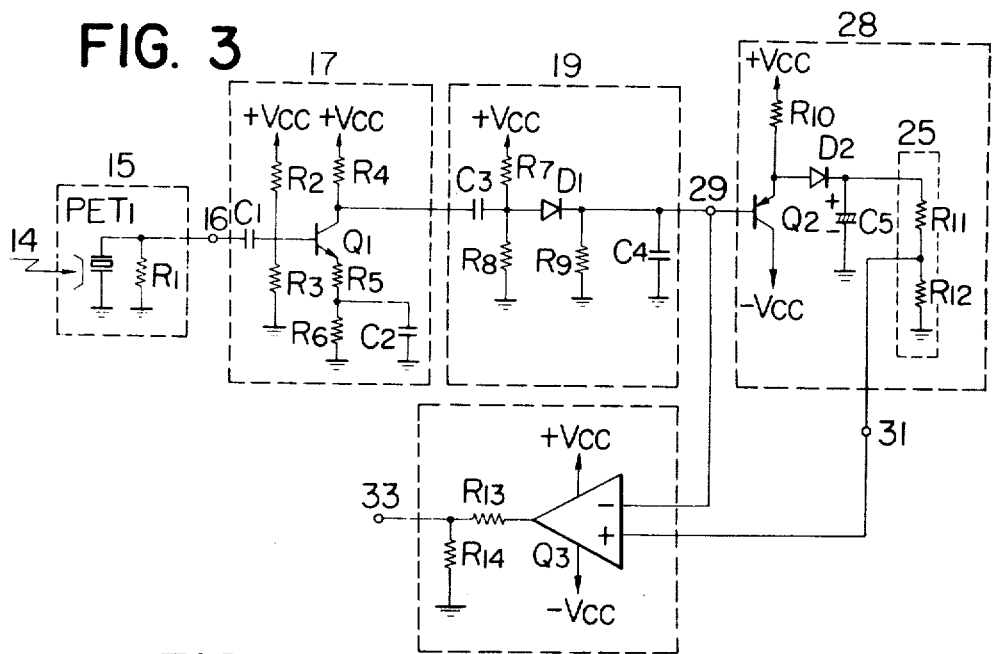
FIG. 3 diagrammatically shows a circuit as an embodiment of the body detecting device according to the present invention.

As a specific embodiment of the present invention, a paper detecting device using ultrasonic wave as signal medium will hereinafter be described in greater detail with reference to FIG. 3. In this case, the arrangement is such that the ultrasonic wave transmitted from a transmitter is received by a receiver opposed to the transmitter with a space therebetween and paper enters into such space to thereby decrease the quantity of reception. In FIG. 3, the transmitter portion is omitted, but the signal transmitted from the transmitter at approximately 40 KHz is received by the receiver 15. This receiver uses a piezoelectric converter element $PET_1$ such as crystal or the like to convert the incident ultrasonic wave into an AC signal of the same frequency corresponding to the quantity of reception. It will be noted that a resistor $R_1$ is provided as the load resistance for the element $PET_1$. The AC signal is amplified by an amplifier 17. The amplifier 17 is an AC amplifier and the signal entering thereinto passes through a DC blocking capacitor $C_1$ to the base of a transistor $Q_1$ suitably biased by resistors $R_2$ and $R_3$. The transistor $Q_1$, resistors $R_4$-$R_6$ and bypass capacitor $C_2$ together constitute a transistor AC amplifier of the conventional emitter negative feedback type, which provides a voltage gain of approximately R4/R5. The signal amplified therein is applied as input to a DC converter 19. The signal is then passed through a DC blocking capacitor $C_3$ and half-wave rectified by a diode $D_1$, and the peak value of the rectified signal charges a capacitor $C_4$ so as to be held thereby, whereafter it is applied to a terminal 29 as a DC level signal. At this point, resistors $R_7$ and $R_8$ are provided to correct the forward rising voltage of the diode $D_1$, and resistor $R_9$ is a discharge resistance for capacitor $C_4$.

Thus, where the output signal of the amplifier 17 is the peak-to-peak voltage $V_{o17}$, the DC voltage $V_1$ at the terminal 29 will be: $V \approx V_{o17}/2$. The output from the terminal 29 is applied both to comparator 27 and reference level store means 21. In the reference level store means 21, the signal from the terminal 29 is applied to the base of a transistor $Q_2$. The transistor $Q_2$ is employed as a conventional emitter follower and provides an impedance converter for increasing the input impedance and for decreasing the output impedance.

The voltage signal impedance-converted is passed through a diode $D_2$ to charge a capacitor $C_5$. The diode $D_2$ serves to prevent the charges stored in the capacitor $C_5$ from discharging through the transistor $Q_2$, as well as to correct the voltage at terminal 29 when it is shifted up by the base-emitter voltage $V_{BE}$ of the transistor $Q_2$. Thus, assuming that the discharge time constant of the capacitor $C_5$ is sufficiently long, the capacitor $C_5$ holds the maximum voltage at the terminal 29. Resistors $R_{11}$ and $R_{12}$ primarily form a discharge time constant as $C_5 \times (R_{11} + R_{12})$, and also serves to divide the voltage held by the capacitor $C_5$ so that it may assume an appropriate value as the threshold voltage in the comparator, and further corresponds to the threshold value setting means 25. The voltage so divided is passed through a terminal 31 to the comparator 27, which ultimately compares the output voltages at the terminals 29 and 31. The comparator 27 employs an operational amplifier $Q_3$ without feedback action and has its negative input terminal (−) and positive input terminal (+) respectively connected to the voltages at the terminals 29 and 31, whereby when the voltage at the input (+) is higher than that at the input (−), there is an output of $+V_{cc}$ approximate to the source voltage of the operational amplifier $Q_3$ and when the voltage at the input (−) is higher than that at the input (+), there is an output of approximately $-V_{cc}$. The output is divided by resistors $R_{13}$ and $R_{14}$ and applied to a detecting terminal 33 to operate a lamp or like means which informs that paper has been detected. Inasmuch as the input impedance at the input terminals of the operational amplifier $Q_3$ is great, the time constants of the capacitors $C_4$ and $C_5$ are hardly affected.

When a sheet of copy paper used in a copying apparatus passes between the ultrasonic wave transmitter and receiver, the gain is reduced in a reduction in quantity by at least 12 dB, as compared with the case where such copy paper is absent. Therefore, if the level reduced down to 6 dB from the positive (+) terminal voltage of the capacitor $C_5$ by the divider 25 is regarded as the threshold vaue, then $\Delta V_{H1}$ and $\Delta V_{L1}$ in FIG. 2 are relatively corrected and stable detecting function may be performed without malfunctioning even if $\Delta V_{H2}$ and $\Delta V_{L2}$ are fluctuated by 3 dB relative to $V_L$ and $V_H$, respectively.

The slow fluctuation of the transmission and reception gain of the ultrasonic wave due to the other factors than the body is approximately 26 dB and this is very great as compared with the fluctuation of 12 dB due to the paper, but it could fully be corrected by the present invention.

Generally, in order to improve the rising of the detecting operation, the time constant $C_4 \times R_9$ should preferably be small, but it may be set to a suitable value so that any suddenly varying factor such as noise produced in a short time may be absorbed or that the ripple component of direct current may be reduced. Next, the discharging time of the capacitor $C_5$ is set to a value greater than the maximum time required for the passage of paper, in view of the cases where the stay of paper in a copying apparatus should be detected. This is because the detection of the paper during its passage might be wrong if the voltage across the capacitor $C_5$ is dropped and attenuated to a level below a predetermined value due to the discharging thereof. However, if such time constant were too great, the storing operation could not follow the rise of the reference value in the absence of paper and the detection effect would be limited under the conditions wherein the reference level is subject to sharp changes.

Since, generally, the time during which the change in the reference level rises due to the presence of copy paper in a copying apparatus is less than 0.01 sec. and the time required for the passage of the paper through the apparatus is of the order of 15 sec., a very stable detecting operation has been obtained in the present embodiment by selecting $C_4 \times R_9 \approx 0.005$ sec. and $C_5 \times (R_{11} + R_{12}) \approx 90$ sec.

The arrangement of the ultrasonic wave elements capable to detect with high accuracy and efficiency the presence or the passage of a paper or the like at the path of copy paper will be explained referring to FIGS. 11–15.

Figure 11:
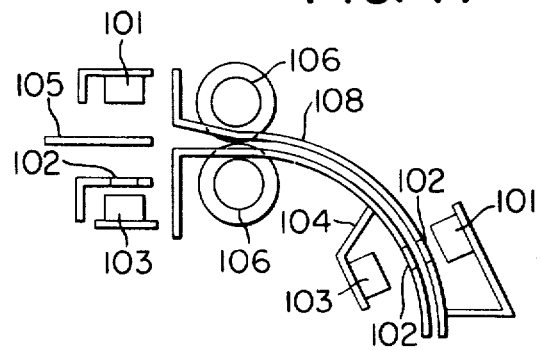
FIGS. 11–15 are the schematic view of an electronic copying apparatus of the present invention in which ultrasonic wave elements, as transmitter, receiver, are arranged along a path of copy paper.
Figure 12:
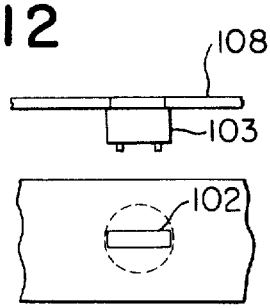

In FIG. 11, there is shown a slit-device having an aperture equal to or larger than the wave length of ultrasonic wave generated by the ultrasonic transmitter 101. The slit-device is provided at the opposed portion of the transmitter 101 and the receiver 103, and such device shields the ultrasonic receiver from an error signal reflected or refracted at the supportor 104. An of such a slit-device is shown in FIG. 12. In FIG. 11, 105 is a paper and 106 is a roller for transporting the copy paper.

Figure 13:
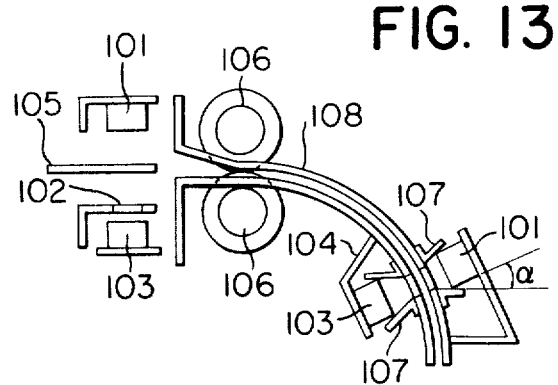

In FIG. 13, cones 107 are provided at the slit portion of FIG. 11 for preventing the dispersion of the ultrasonic wave. In this case satisfactory accuracy is obtained by experimentally, even if there is no slit type aperature.

The accuracy is proved to be better when the angle $\alpha$ is smaller, however, the absolute quantity of the ultrasonic wave becomes smaller, therefore, the optimum value of $\alpha$ should be experimentally decided considering the sensitivity of the receiver. The accuracy can be effected even when such cones are provided at only the receiver side.

Figure 14:
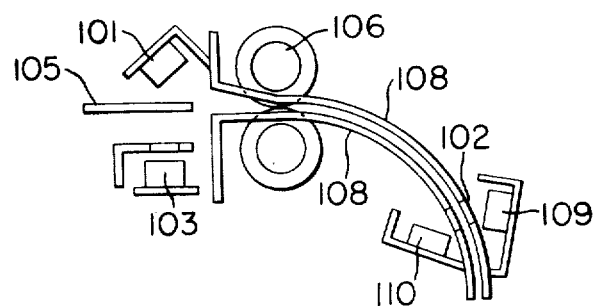

In FIG. 14, there is shown a passage constituted by the guides 108 to be used as the transmitting path of the ultrasonic wave, where in transmitter 101 and receiver 109, 110 are arranged so that the quantity of the signal to be received becomes equal when there is no paper in the guide 108, and therefore the the detection of the presence of paper may be made by the unbalancing of the quantity of signal received. Furthermore, detection may be based on a decrease of the received signal by using only one receiver 109.

Figure 15:
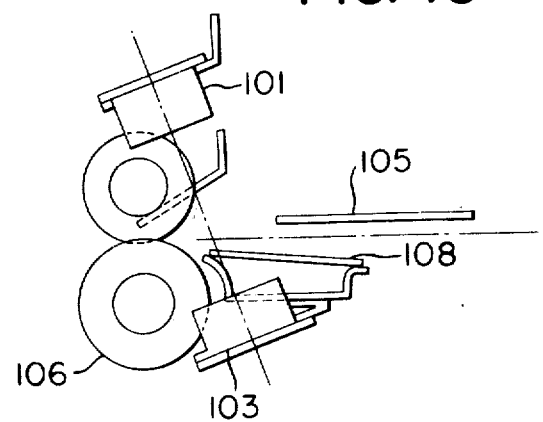

Therefore, as stated above it is capable to detect the presence of paper in that long and curved passage by least number of elements, for instance 2-3 elements. When the slot shown in FIG. 12 can not be provided, it is capable to raise the detecting accuracy by arranging a pair of ultrasonic oscillator 101, 103 obliquely opposed relation along the passage as shown in FIG. 15 but not perpendicularly opposed relation.

Further the main composition of the ultrasonic elements used in the present invention is $PbTiO_3$, $PbZrO$, $Pb(MG\frac{1}{3},Nb\frac{2}{3})O_3$ and the construction of said elements are well known bimorph type oscillator. The characteristics of the oscillator for use of transmitter and receiver are, center frequency is $40\pm1KHz$, sensitivity is $-67$ dB/volt/$\mu$ Bar (at center frequency), band width is 4KHz (at sensitivity $-73$ dB/volt/$\mu$ Bar) and is directivity $\pm30°$.

Figure 4:
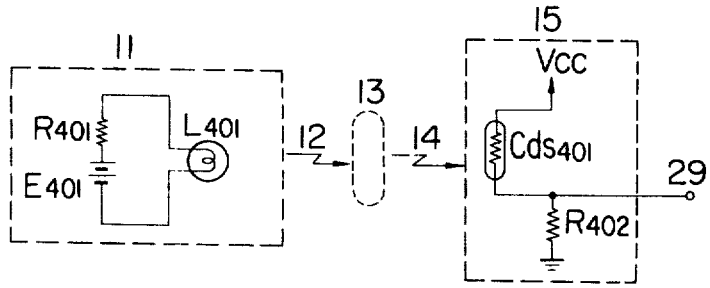
FIG. 4 is a circuit diagram of an example of the transmitter and receiver arrangement applicable to the present invention.

The present invention is not restricted to the embodiment of FIG. 3, but it may be embodied in a detector device as shown in FIG. 4, wherein light between a pair of lamp and light-sensing element is utilized as medium. In FIG. 4, numeral 11 designates a conventional lamp energizing circuit and accordingly, numerals 12 and 14 designate visible light. The reception circuit 15 comprises a cadmium sulfide element $CdS_{401}$ and a fixed resistor $R_{402}$. Unless the light 14 is interrupted by a body 13, the voltage level at the terminal 29 will exhibit a high level since the resistance value of the $CdS_{401}$ is low. If the body 13 is present in the path of light, a converse condition will occur. After that, the detecting function entirely similar to that described may be performed by the use of the circuits subsequent to the terminal 29 in FIG. 3. Since the output of the receiver 15 is at a DC level, the DC converter 19 is eliminated herein, whereas if amplitude-modulated light is utilized, the circuit arrangement as shown in FIG. 3 will be adopted. Also, by increasing the division ratio of the resistors $R_{11}$ and $R_{12}$ in the threshold setting means 25 of FIG. 3, the threshold value may be set to the vicinity of the reference level of the terminal 29 or conversely, to the vicinity of the low level during the passage of paper to thereby quicken the rising of detecting operation during the entry or the discharge of the paper. Further, the resistor $R_{11}$ or $R_{12}$ may be a variable one to vary the rising condition. These also hold true with ensuing embodiments.

The objects of the present invention may be achieved by the arrangements shown in FIGS. 3 and 4, but the reference level store means 21 of FIGS. 5 and 6 will hereinafter be described which eliminate the above-noted limitations in the detecting function which pertains to the time constant circuits.

Figure 8:
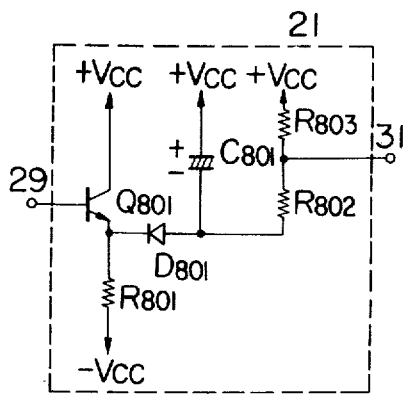

If the level in the reference condition is either lowered or raised under the influence of the body, it will be sufficient to provide a simple reference level store means 21 using a capacitor as shown in FIG. 3. However, when the condition without the presence of paper is regarded as the reference condition for the detection of paper through the detection of signal reflection or when the condition with the presence of paper is regarded as the reference condition for the detection of transmission gain as in FIG. 3, the minimum value of the quantity of reception is stored as the reference level. In such cases, the input from the terminal 29 to the reference level store means 21 may be inverted so that the maximum value thereof may be stored in the same manner as in FIG. 3, or alternatively, as shown in FIG. 8, an arrangement in which the flow of current is entirely opposite to that in FIG. 3 may be used to store the minimum value. However, in the reference level store means 21 as shown in FIG. 3, the stored level is varied or volatilized due to discharge as time elapses.

Figure 5:
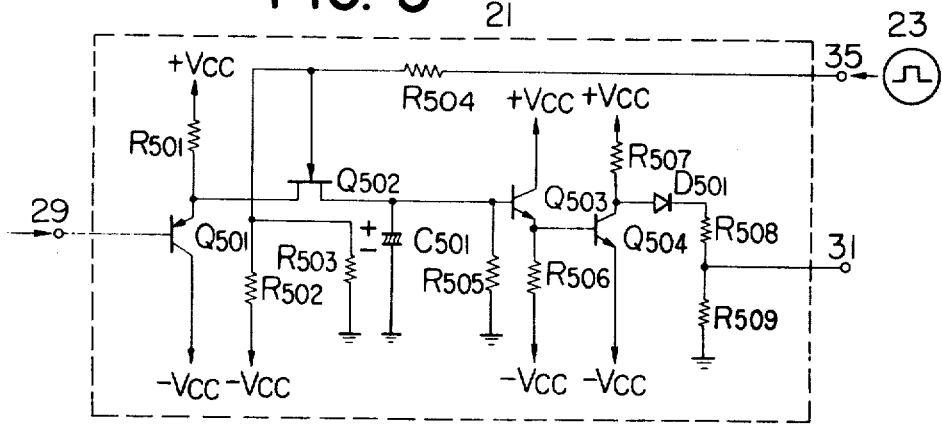
FIGS. 5, 6, 7 and 8 diagrammatically show various embodiments of the reference level store means in the present invention.

FIG. 5 shows an arrangement in which a switching element $Q_{502}$ is provided on the input side of a storage capacitor $C_{501}$ and a store instruction of positive pulse is imparted from store instructing means 23 through a terminal 35 to provide the function of storing the then value at the terminal. This means that the maximum or the minimum value is not stored as the reference level during the reference condition, as in the previous embodiment, but the signal immediately before the detection of the body is stored as the reference level or the reference condition is judged by detecting or observing it through a separate device so that the then reception signal is stored as the reference level, and this also prevents any reduction in the stored value. In FIG. 5, switching element $Q_{502}$ and resistors $R_{502}$-$R_{504}$ together constitute a switching means and the gate bias of the element $Q_{502}$ is varied from negative to zero or positive by the positive pulse from the terminal 35, whereby the drain-source resistance is varied from its high level to its low level. The value then at the terminal 29 is stored as the reference level by capacitor $C_{501}$ through emitter follower connected transistor $Q_{501}$. If, at this point, the previously stored level is higher than the present reference level described above, the difference therebetween will be discharged through transistor $Q_{501}$.

Also, a high resistor $R_{505}$ and transistors $Q_{503}$ and $Q_{504}$ constituting complementary emitter followers are connected to the capacitor $C_{501}$, so that the charges in the capacitor $C_{501}$ are scarcely discharged through voltage-dividing resistors $R_{508}$ and $R_{509}$. Therefore, the capacitor $C_{501}$ continues to hold the charges, namely, to store the reference level, until a subsequent positive pulse is applied as input.

Diode $D_{501}$ serves to correct the drop of the base-emitter voltage of each of transistors $Q_{501}$, $Q_{503}$ and $Q_{504}$ which constitute emitter followers. Thus, a voltage substantially at the same level as the level entered as the reference value is applied to the voltage dividing resistor. Also, the pulse as instruction signal may be intermittently provided by using a signal source which generates a series of pulse signals prior to the detection of the body.

Figure 10:
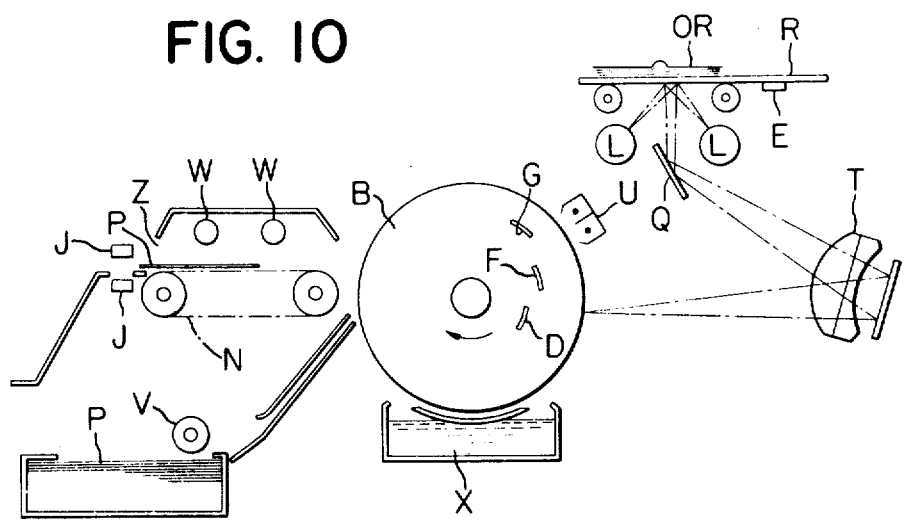
FIG. 10 is a schematic view of an electronic copying apparatus in which the present invention is applied.

An example of this will be described with reference to FIG. 10 which is a schematic illustration of an electronic copying apparatus.

Usually, a switch J for detecting copy paper P to confirm the discharge of copy paper is provided near the terminus of the path of travel of copy paper. Also, the time required for a sheet of copy paper P to reach the switch J by being normally conveyed on a conveyor belt N after the copy paper has been fed by a paper feed roller V is generally constant. In other words, the point of time at which the switch J detects the copy paper P can sufficiently be anticipated.

Therefore, if the detector device of the present invention is applied to the above-described switch J, the correction of the reference level may occur immediately before the detection of the copy paper. More specifically, by the use of a timer which initiates its time limit operation synchronously with paper feed and terminates the time limit operation immediately before the copy paper is detected, the pulse generated at the end of the time limit may be made into the aforementioned instruction signal.

Also, in case where an manuscript OR is optically scanned when a manuscript carriage R or a light source moved reciprocally, the paper feed timing is synchronous with the movement of the manuscript carriage or the light source and therefore, the above-mentioned timer can be operated by a cam switch E which is operable in response to said movement. However, when the copy paper fed is discharged during said reciprocal movement, said pulse as the instruction signal can be provided by a cam switch (not shown) operable immediately before the discharge of the copy paper.

Likewise, in case where the rotation of a photosensitive drum B on which an electrostatic latent image may be formed is synchronous with the paper feed timing, said pulse may be provided by a cam switch D. Cam switches D, F and G respectively correspond to drum home, paper feed and paper discharge timing. In FIG. 10, letter X designates a developing device, W a fixing device, and V a charger.

Figure 6:
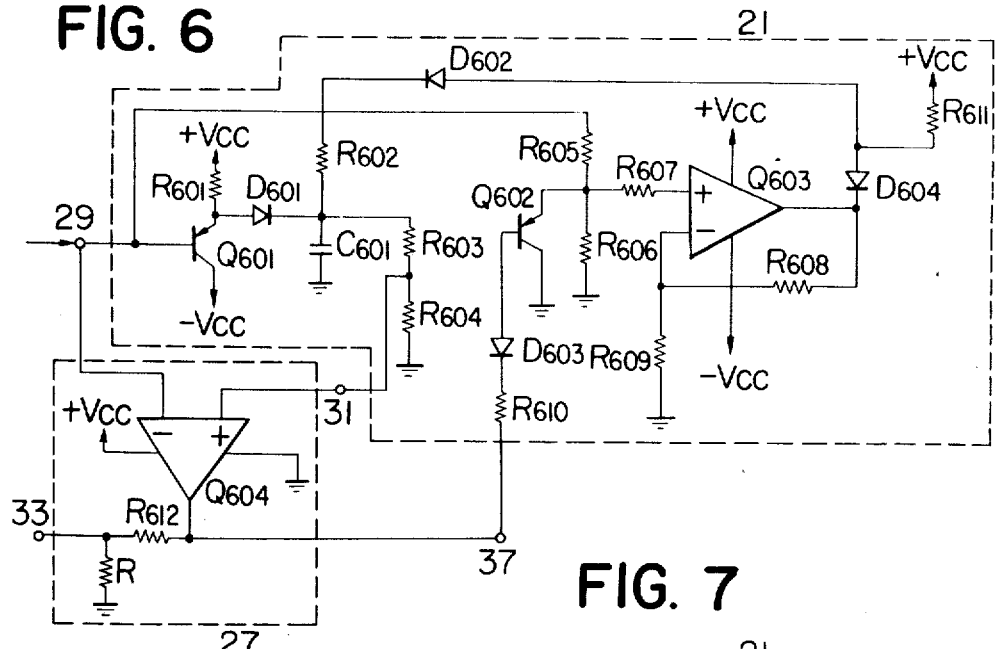
Figure 7:
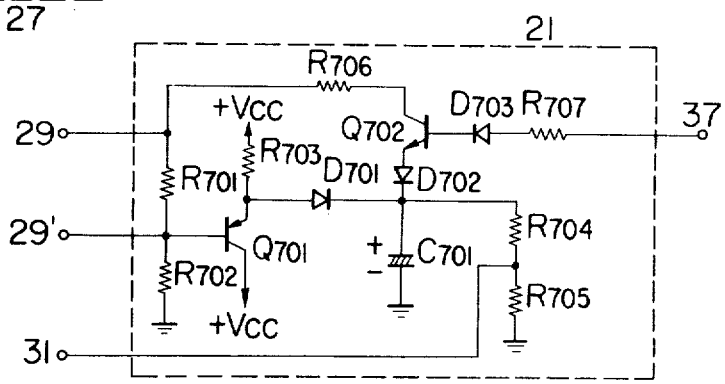

Also, if the reference level is the maximum or the minimum value of the reception level as in the embodiment of FIG. 3, the volatilization of the stored level during the detection of the body may be prevented by a circuit arrangement shown in FIG. 6 or 7. In FIG. 6, transistor $Q_{601}$, diode $D_{601}$, capacitor $C_{601}$ and voltage dividing resistors $R_{603}$, $R_{604}$ in the reference level store means 21, and the comparator 27 are all functionally similar to those shown in the embodiment of FIG. 3. The present embodiment is featurized by a circuit as anti-volatilization means including a switching element for applying a voltage to the storage capacitor in accordance with the reception level during the detection of the body.

Assuming that a body intervenes between the opposing transmitter and receiver to drop the voltage at the input terminal 29, the potential at the output terminal 33 of an operational amplifier $Q_{604}$ rises. This raises the base voltage of a transistor $Q_{602}$ which has so far been dropped through a resistor $R_{610}$ and a diode $D_{603}$, and thus the transistor $Q_{602}$ is rendered non-conductive.

During conduction of the transistor $Q_{602}$, the positive (+) and negative (31) input terminals of an operating amplifier $Q_{603}$ were at zero potential of substantially the same polarity and therefore, the output of the operating amplifier $Q_{603}$ exhibited zero potential so that the diode $D_{602}$ was non-conductive and the amplifier $Q_{603}$ was affecting the capacitor $C_{601}$ in no way. However, the transistor $Q_{602}$ is now temporally rendered non-conductive, whereby a voltage derived by resistors $R_{605}$ and $R_{606}$ dividing the voltage of the terminal 29 is applied as input to the positive (+) terminal of the amplifier $Q_{603}$. Thus, the output at this time assumes a potential $(R_{606}/R_{605} + R_{606}) \times (R_{608}/R_{609})$ times as high as the voltage at the terminal 29, and is applied to the terminal of the capacitor $C_{601}$ through diode $D_{602}$ and resistor $R_{602}$. However, it should be understood that diode $D_{604}$ and resistor $R_{611}$ are inserted to correct any drop of the anode-cathode voltage of the diode $D_{602}$ and that diode $D_{603}$ is also effective to prevent application of any excessive inverse voltage from the base-emitter of the transistor $Q_{602}$.

The potential at the terminal 29 drops in this manner until the capacitor $C_{601}$ starts to discharge through voltage dividing resistors $R_{603}$ and $R_{604}$, whereupon a predetermined voltage proportional to the voltage at the terminal 29 is applied to the capacitor $C_{601}$ through diode $D_{602}$, whereby the voltage at the positive (+) terminal of the capacitor $C_{601}$ does not drop below that level. Therefore, by suitably setting such level, the detecting function may be performed without malfunctioning even if the body stays between the detecting means for a long time. When the body has passed and the reception signal again restores the reference condition, the output voltage of the amplifier $Q_{603}$ momentarily rises with the voltage rise at the terminal 29, but sudden voltage rise at the positive (+) terminal of the capacitor $C_{601}$ up to the level above the voltage at the terminal 29 may be prevented by setting the charging time constant of $R_{602} \times C_{601}$ to a suitable length. During that while, the output of the operational amplifier $Q_{604}$ naturally drops to a low level to render the transistor $Q_{602}$ conductive, so that the output of the operating amplifier $Q_{603}$ again drops to zero potential, thus affecting the potential across the capacitor $C_{601}$ in no way.

The storage holding method in FIG. 6 may of course be replaced by a method as shown in FIG. 7 which eliminates the amplifier $Q_{603}$. In the case of FIG. 7, the potential at the terminal 29 is divided by resistors $R_{701}$ and $R_{702}$ and, by selecting the division ratio to $$\frac{R_{702}}{R_{701} + R_{702}} = \frac{R_{604}}{R_{603} + R_{606}} \times \frac{R_{608}}{R_{509}},$$

the example of FIG. 7 may be considered entirely in the same manner as in the example of FIG. 6. In this case, however, the output of terminal 29' must be connected to the negative (−) terminal of the comparator.

Figure 9:
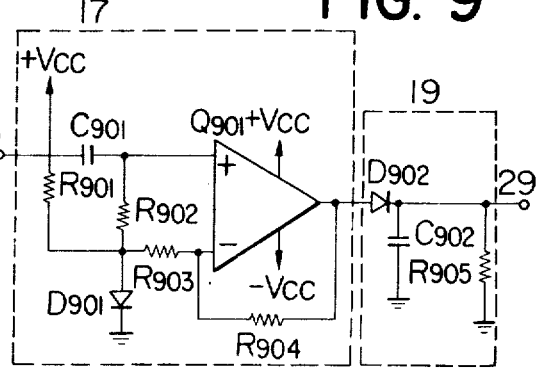
FIG. 9 is a diagram showing an embodiment of the reception signal converter means in the present invention.

By the circuit of the present invention, as has hitherto been described, initial gain irregularity or slow gain variation in the device of this type may be corrected without resorting to adjustment but, of course, the range of correction is not limitless. What factors limit the correction range will now be considered. Firstly, there is a saturation related to the source voltage $+V_{cc}$ or $-V_{cc}$ of each active element when the receiver input level has become high, and such saturation prevents the input and the output from corresponding linearly to each other. To cope with this problem, there is only a simple method of selecting a high source voltage and highly pressure-resistant elements or of suitably attenuating the input signal at the initial stage. In contrast, the factor limiting the correction for the low level of input is the error resulting from the voltage level shift in each active element, such as, for example, the base-emitter drop voltage $V_{BE}$ in the emitter follower or the forward rising voltage $V_{AK}$ in the diode. For example, if the input signal becomes very small in the circuit of FIG. 3, the output voltage of the amplifier 17 and the output of the DC converter 19, i.e. the voltage value at the terminal 29 will not be completely proportional to each other because of the error resulting from the forward rising voltage of the diode $D_1$, and also a voltage difference resulting from the transistor $Q_2$ which is an emitter-follower type amplifier will occur between the maximum voltage at the terminal 29 and the voltage at the positive (+) terminal of the capacitor $C_5$ in the reference value level store means 21. Simple methods of correction for these errors have already been referred to in connection with each of the circuit examples so far mentioned. In the foregoing two examples, they are the voltage correction by the bias circuit of resistors $R_7$ and $R_8$ and the voltage correction by the diode $D_2$, respectively. Nevertheless, none of these methods is complete. Now, to further correct the error resulting from the rectifier diode $D_1$ in the DC converter 19 of FIG. 3, an example as shown in FIG. 9 will also occur to mind. In a circuit 17 which corresponds to an amplifier, the output from the receiver is connected through a DC blocking capacitor $C_{901}$ to the positive (+) terminal of an operational amplifier. This operational amplifier must be of low input offset voltage, but the anode voltage of a diode $D_{901}$ is rendered into the DC bias voltage at the positive (+) terminal by a resistor $R_{902}$ the resistance value of which is great to such an extent that it affects in no way the input signal from the terminal 16, and the anode voltage is also rendered into the bias voltage at the negative (−) terminal of the amplifier $Q_{901}$ by a resistor $R_{903}$, whereby the DC level of the output may be made equal to the input, i.e. the anode voltage of the diode $D_{901}$. The amplifier $Q_{901}$ amplifies the AC input voltage signal from the terminal 16 to $R_{904}/R_{903}$ times by means of a negative feedback resistor $R_{904}$. The AC signal so amplified may be biased at the output terminal, as already described, by an amount corresponding to the anode voltage of the diode $D_{901}$, i.e. the forward rising voltage of the diode. Therefore, assuming that the forward rising voltage of the rectifier diode $D_{902}$ in the DC converter 19 is equal to that of the diode $D_{901}$, the DC voltage $V_1$ at the terminal 29 will be:

$$V_1 = V_{in} \times (R_{904}/R_{903}) - 2.$$

where $V_{in}$ is the peak-to-peak value of the input voltage from the input terminal 16; and thus, $V_1$ can be completely proportional to $V_{in}$. The equalization of the rising voltages of the diodes may be accomplished by using diodes $D_{901}$ and $D_{902}$ which are equal in temperature and forward characteristics, and further by suitably setting the forward bias current of the diode $D_{901}$, with the aid of the resistor $R_{901}$, in accordance with the rectified current of the diode $D_{902}$ resulting from capacitor $C_{902}$ and resistor $R_{905}$.

Further, the proper range of the reference level stored by the use of the amplifier 17 and the DC converter 19 shown in FIG. 9 and further by the use of the reference level store means 21 shown in FIG. 3, namely, the range over which the fluctuations resulting from the other factors than the body are corrected, is about 54 dB, corresponding to about 3 mV to about 1.5V, for the peak-to-peak input voltage $V_{in}$ of the input terminal 16, and this means a very wide range of detection.

While the foregoing embodiments have been described with respect to detection of the presence of paper or like body, it may readily be inferred that the present invention is also effective for the detection of the condition of presence of the body or the positional relation of the body to the transmitter and receiver.

Further, the present invention is not restricted to the detection of physically solid matter but is still effective for the detection of the presence, quantity or density of gases and liquids. For example, for the detection of the density of developer in a copying apparatus, the transmitter and receiver as shown in FIG. 4 may be used but the developer tends to adhere to the transmitter and receiver during long-time use of the copying apparatus, thus causing errors in the detection. The present invention can prevent such malfunctioning.

We claim:

1. A device for detecting a body at a predetermined position comprising:
    means for generating a detecting signal;
    receiver means for receiving the signal from said signal generating means;
    means for setting the value of a reference signal in response to the signal received from said receiver means in the absence of a said body at said predetermined position, to correct said reference signal in response to variations in ambient conditions, wherein said reference signal is for providing a reference for use in determining whether a said body is present at said predetermined position;
    means for storing the reference signal, and
    comparator means connected to compare said reference signal from said storage means with a signal received by said receiver means, wherein the output of said comparator means provides an indication of the presence or absence of said body at said predetermined position.

2. A device according to claim 1, wherein said storing means stores as a reference value the level of the received signal, and wherein said comparator means utilizes said stored signal as a threshold value for comparison with the received signal.

3. A device according to claim 2, wherein the reference level stored in said storing means is a DC voltage level.

4. A device according to claim 3, wherein said signal generating means comprises an ultrasound generator, and said receiver means comprises an ultrasound receiver and an electric-acoustic converter, and said device further comprises means for converting the electrically converted received signal into a DC voltage level signal, the output of said converter means being connected to the inputs of said reference level storing means and said comparator means to enable detection of a transparent body.

5. A device according to claim 3, further comprising means for converting the received signal into a DC voltage level, said converting means including an amplifier and a diode for rectifying the output of said amplifier, and a DC level setting element being provided at the input of said amplifier to convert the forward characteristic of said diode.

6. A device according to claim 4, further comprising store instruction means for providing an intermittent signal for causing the reception level of said received signal to be stored and re-stored in said storing means, and wherein the level stored in accordance with said instruction signal is held until the occurrence of the next successive intermittent signal.

7. A device according to claim 6, wherein said reception level is a DC voltage level, said storing means includes means for charging and discharging a storage element in response to changes in said reference value, and wherein said store instruction means includes switching means for controlling said charging and discharging in response to the instruction signal.

8. A device according to claim 1, further comprising means for holding the reference value stored by said reference level storing means at a predetermined level throughout the body detection in accordance with the reception level during the body detection.

9. A device according to claim 8, wherein said predetermined level is a DC voltage level, and said reference level storing means includes a capacitor chargeable by said DC voltage level and said holding means includes a switching element for applying to said capacitor a voltage corresponding to the then received signal level from the signal generator to prevent the electric charges from being discharged during the body detection.

10. A device for detecting the presence of copying paper at a predetermined position in a copying machine by using ultrasound signals comprising:
means for generating ultrasound signals;
ultrasound signal receiver means for receiving the ultrasound signals from said generating means, said ultrasound signal generating means and receiver means being disposed on opposite sides of a copying paper passage;
shielding means for protecting the ultrasound signals varied by the interruption of copy paper to be detected from being influenced by ultrasound signals reflected or refracted by elements other than the paper to be detected, and from being influenced by the quality of the paper;
a conversion circuit for converting a signal received by said ultrasound receiver means to an electric signal; and
means for comparing an output signal from said circuit to a reference signal and for generating an electric signal representing the presence of the paper.

11. A device according to claim 10, wherein said shielding means is a slit-device or a cone member disposed between said ultrasound signal generating and receiving means.

12. A device according to claim 11, wherein said copy machine includes guide members for passing copy paper therethrough, and wherein said ultrasound signal generating means is disposed adjacent one end of said guide members for applying ultrasound signals therethrough and said ultrasound receiver is disposed to detect changes in said signals applied to said guide members due to the passing of said copy paper through said ultrasound receiver means is arranged to detect changes in ultrasound due to the paper passing through said guide members.

13. A device according to claim 10, wherein said ultrasound signal generating means is disposed with a slant with respect to the surface of the paper to be detected.

14. A device for detecting a body comprising:
means for generating ultrasound signals;
receiver means for receiving the ultrasound signals from said generating means, said receiver means including an ultrasound receiver and an acoustic-electric converter;
means for setting the value of a reference signal in response to the ultrasound signals received by said receiver means while the body is in a reference condition to adjust the reference signal in response to changes in ambient conditions, the reference signal providing a reference for use in determining whether or not the body is present between said generator and receiver means;
means for storing the reference signal;
comparator means for comparing a signal received by said receiver means with a signal provided by said storing means; and
means for converting the electrically converted received signal into a DC voltage level signal, the output of said converter being applied to said storing means to said comparator means, whereby a transparent body may be detected.

15. A device for detecting copying paper in a copying machine comprising:
means for generating ultrasound signals;
receiver means for receiving the ultrasound signals from said generating means, said receiver means including an ultrasound receiver and an acoustic-electric converter;
means for setting the value of a reference signal in response to the ultrasound signals received by said receiver means while the paper is in a reference condition to adjust the reference signal in response to changes in ambient conditions, the reference signal providing a reference for use in determining whether or not the paper is present between said generator and receiver means;
means for storing the reference signal
comparator means for comparing a signal received by said receiver means with a signal provided by said storing means; and
means for converting the electrically converted received signal into a DC voltage level signal, the output of said converter being applied to said storing means and to said comparator means, whereby a transparent paper may be detected.

* * * * *